United States Patent [19]

Gilli et al.

[11] Patent Number: 4,659,900

[45] Date of Patent: Apr. 21, 1987

[54] LASER CUTTING MACHINE

[75] Inventors: Luigi Gilli; Domenico Peiretti, both of Torino, Italy

[73] Assignee: Prima Industrie S.p.A., Italy

[21] Appl. No.: 746,295

[22] Filed: Jun. 19, 1985

[51] Int. Cl.$^4$ .............................................. B23K 26/00
[52] U.S. Cl. ....................... 219/121 LG; 219/121 LU; 219/121 LV
[58] Field of Search ................. 219/121 LG, 121 LN, 219/, 121 LU, 121 LV, 121 LC, 121 LD, 121 LP, 121 LQ, 121 LR, 121 LA, 121 LB; 364/474, 475

[56] References Cited

U.S. PATENT DOCUMENTS 3,597,578  8/1971  Sullivan .................... 219/121 LV X

FOREIGN PATENT DOCUMENTS 0224091  12/1983  Japan ............................. 219/121 LU
0078792   5/1984  Japan ............................. 219/121 LR

*Primary Examiner*—C. L. Albritton
*Attorney, Agent, or Firm*—Wigman & Cohen

[57] ABSTRACT

A laser cutting machine consisting of a focusing head; an exit nozzle; a joint structure which supports the head; a control unit; a drive device, which is supported by a joint structure and controlled by a control unit to move the head along a specified path in space, whereby a theoretically determined, invariant distance is maintained between the exit nozzle and a plate material to be cut, the head having first and second portions which can move relative to each other in the axial direction; a servomechanism, one end of the portions being coupled to the nozzle and a focusing lens, whereby while the machine is in use, the servomechanism controls the relative motion of the two portions in the axial direction independently of the control unit to maintain a specified and invariant distance between the nozzle and the surface.

7 Claims, 6 Drawing Figures

LASER CUTTING MACHINE

BACKGROUND OF THE INVENTION

The present invention relates to a laser cutting machine, and in particular to a laser cutting machine suitable for cutting thin metal plates or other thin plates.

The focusing head of the laser cutting machine is supported by a jointed support structure in such a way that it is free to move. The support structure is driven so that it moves the head through a predetermined path. It is well-known that in a more sophisticated machine that path could be three-dimensional. In this method any arbitrary shape can be cut in a plane or conical metal plate.

The laser used in the machine has reached a very high degree of perfection, and is capable of cutting both thin metal plates and very thick plates of other materials, but, nevertheless, satisfactory results are not always obtained. In practice, at times the cuts obtained are not as clean or as accurate as desired.

The defect is generally caused not by the focusing lens but by small, randomly distributed undulations on the surface of the thin plate. These undulations cannot be taken into account in the head motion program and are an important cause of defects. It is well known that in order to obtain perfect cuts, the bundles of laser light rays must be focused exactly at an accurately determined and rigorously constant distance from the surface of the work piece. Clearly, every time an undulation is reached along the cutting path the distance changes, as a result of which only part of the laser light energy is transmitted to the work piece.

OBJECTS OF THE INVENTION

One purpose of this invention is to provide a laser light cutting machine that will not have the defect as mentioned above.

Another purpose of this invention is to provide a cutting machine which effectively eliminates problems caused by local deformations in the work piece in a manner which does not produce significant inertial forces or vibrations.

The objectives are achieved by this invention, which relates to a laser cutting machine with the following characteristics. The machine contains a focusing head having a focusing lens, a joint coupling structure which supports the head, a control unit, and a drive mechanism which is supported by the joint coupling structure, moves the head through an arbitrarily shaped path in space, and is controlled by a control unit so as to support the head so that an exit nozzle is held at an unvarying theoretically determined distance from the surface of the plate material, particularly thin metal plate, which is to be cut. The head comprises a first portion and a second portion which are coupled together and are free to move parallel to the nozzle axis. One end of one of the portions contains the nozzle, and one end of the other of the portions contains the focusing lens.

There is also a servomechanism associated with the two portions in addition to the control unit so as to control the motion in the axial direction while the machine is in use to hold the nozzle at a specific and unvarying distance from the surface.

Other characteristics and the advantages of this invention will become clear from the description of the non-limiting embodiment given below with reference to the attached drawing.

DETAILED DESCRIPTION OF A PREFERRED EMBODIMENT

Figure 1:
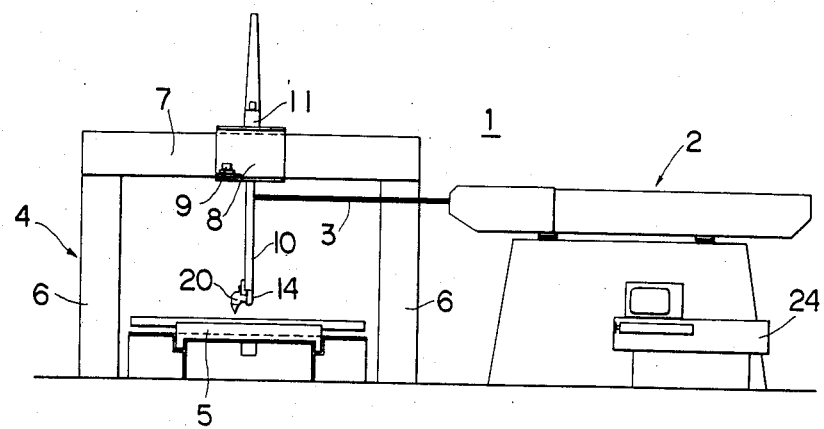
FIG. 1 is a simplified front view of a cutting machine built in accordance with this invention.

FIG. 1 shows a laser cutting machine which taken as a whole is designated 1. The laser generator 2 is capable of emitting a powerful laser bundle 3 horizontally along what is referred to below as the Y-axis. The machine also includes a joint coupling structure 4. This structure 4 receives the laser 3 and redirects it downward toward a work piece which is supported by a platform 5, at the bottom of the structure 4, which is able to move horizontally along the X-axis which is perpendicular to the Y-axis. The laser can be focused on the work piece.

The structure 4 includes two supports 6 which support a transverse member 7 which serves as guides for a carriage 8 the position of which is controlled by a motor 9. The carriage 8 is oriented along the Z-axis, which is perpendicular to the previously defined X and Y-axis, and functions as a guide for the column 10 which is moved along the Z-axis by a motor 11.

In an alternate embodiment of this invention, not shown in the figures, the carriage 8 is absent, the column 10 moves only along the Z-axis, and the platform 5 can move in both the X and Y directions.

Figure 2:
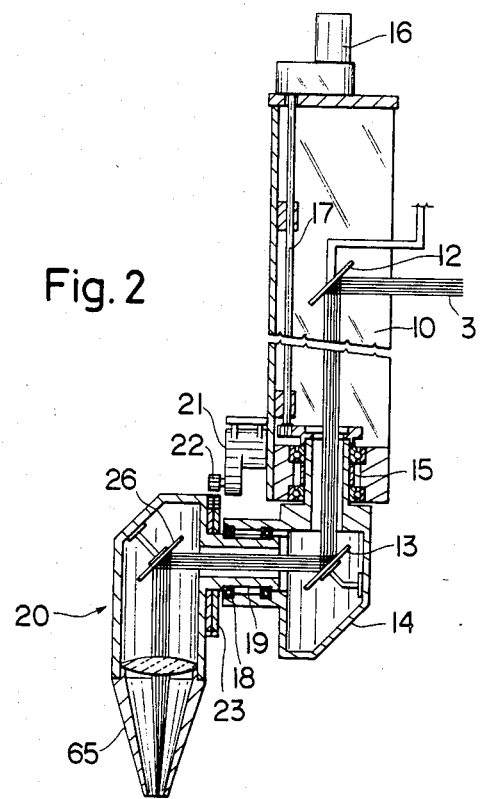
FIG. 2 is a cross-sectional diagram showing part of the cutting machine in FIG. 1 in more detail.

According to what is shown in FIG. 2, the column 10 has a C-shaped horizontal cross-section with the open side of the C faced toward the generator 2. Disposed inside the column 10 is a mirror 12, which is fixed with respect to the carriage 8. The laser bundle 3 which is incident upon it can be reflected downward along the Z axis toward a second mirror 13 which is placed inside of an angular element 14. The element 14 has a tubular appendage 15 which is parallel to the Z-axis and is rotatably coupled to the bottom end of the column 10. Accordingly, the appendage 15 can rotate around the Z-axis, driven by a motor 16 and a related transmission device 17. In addition, the element 14 has a second tubular appendage 18 which is parallel to the XY-plane. The appendage 18 is rotatably coupled to a tubular appendage 19, which is in turn connected to a focusing head 20 such that the appendage 19 extends out from the focusing head 20 in the radial direction. The head 20 can rotate, around the axis of the appendage 18, driven by a motor 21, which has a motor output pinion 22 meshed with a gear 23, which in turn is coupled to the head 20.

The motion of the head 20 along a specified cutting line relative to the work place (not shown) on the top of the platform 5 is controlled by a computer 24. The latter controls the motion of the head 20 so that it is always directly above the point to be cut.

Figure 4:
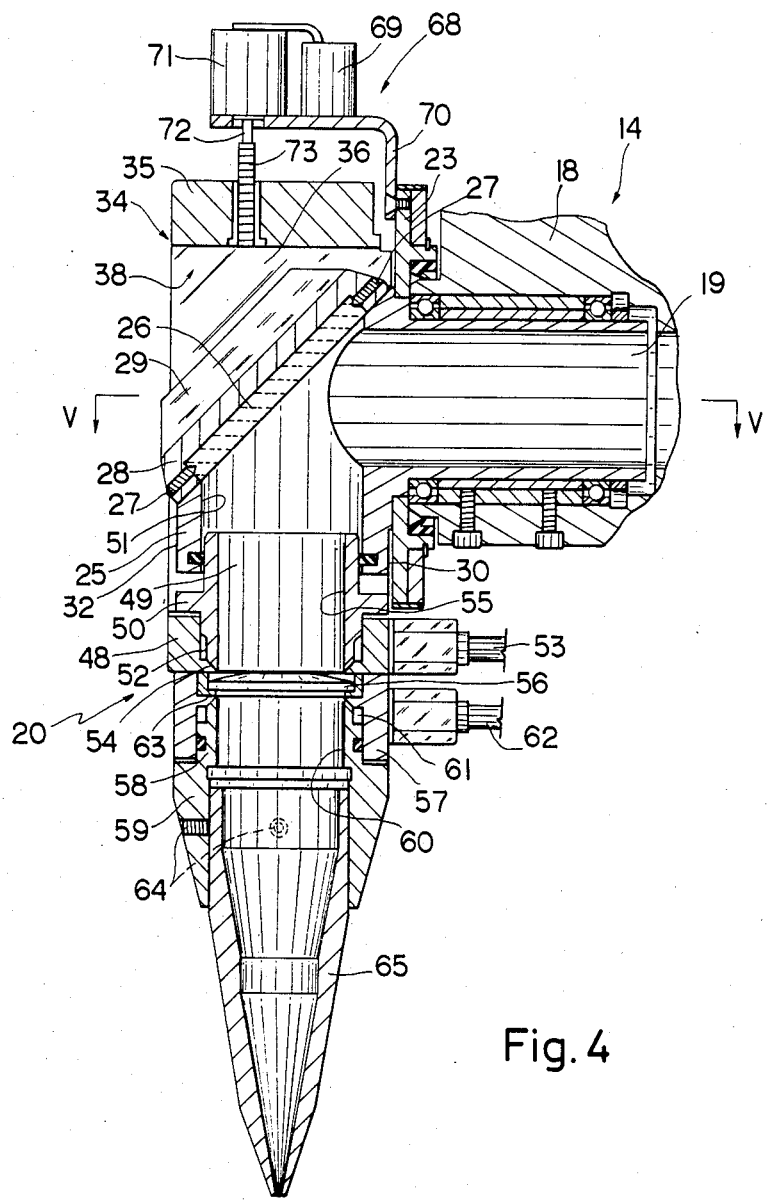
FIG. 4 shows a cross-sectional view taken along IV—IV in FIG. 3.
Figure 5:
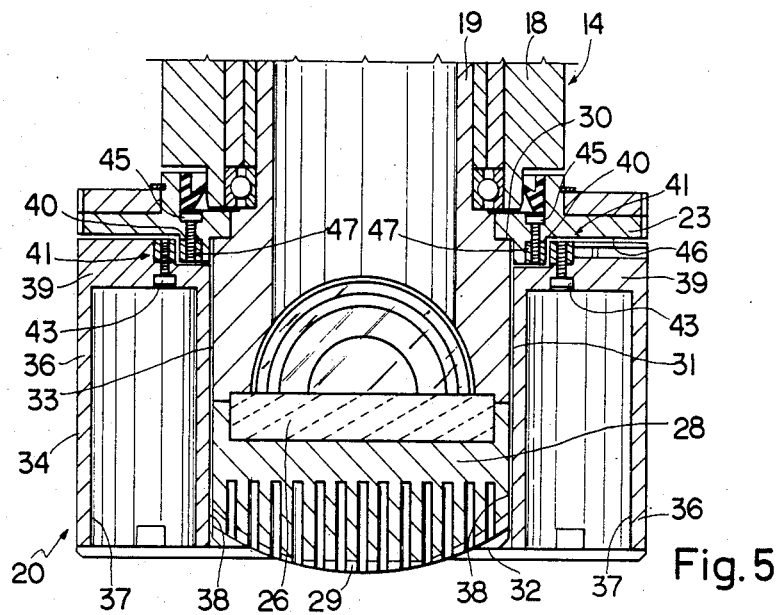
FIG. 5 is a cross-sectional view taken along V—V in FIG. 4.

In particular, as shown in FIGS. 4 and 5, the appendage 19 extends out in the radial direction from a tubular body 25 of the head 20. Its top end is split into one part that is joined to the appendage 19 and a part that is opposite to it. The tubular body 25 is closed to the outside by a frame 28, which is fitted with a finned heat radiator 29, and to which a mirror 26 is attached by screws.

The tubular body 25 externally presents a nearly rectangular cross-section bounded by lateral plane members 30, 31, 32 and 33. The appendage 19 extends out from the surface 30 which is opposite to the surface member 32, which in turn is inserted between the surface members 31 and 33.

The tubular body 25 is slidably mounted inside a nearly U-shaped hollow body 34. The hollow body 34 has a bowed ceiling 35 which is concave downward, and two side walls 36. Disposed between these walls is a cavity 37, which is bounded internally by the plane surface 38 which is joined to the walls 31 and 33.

Figure 3:
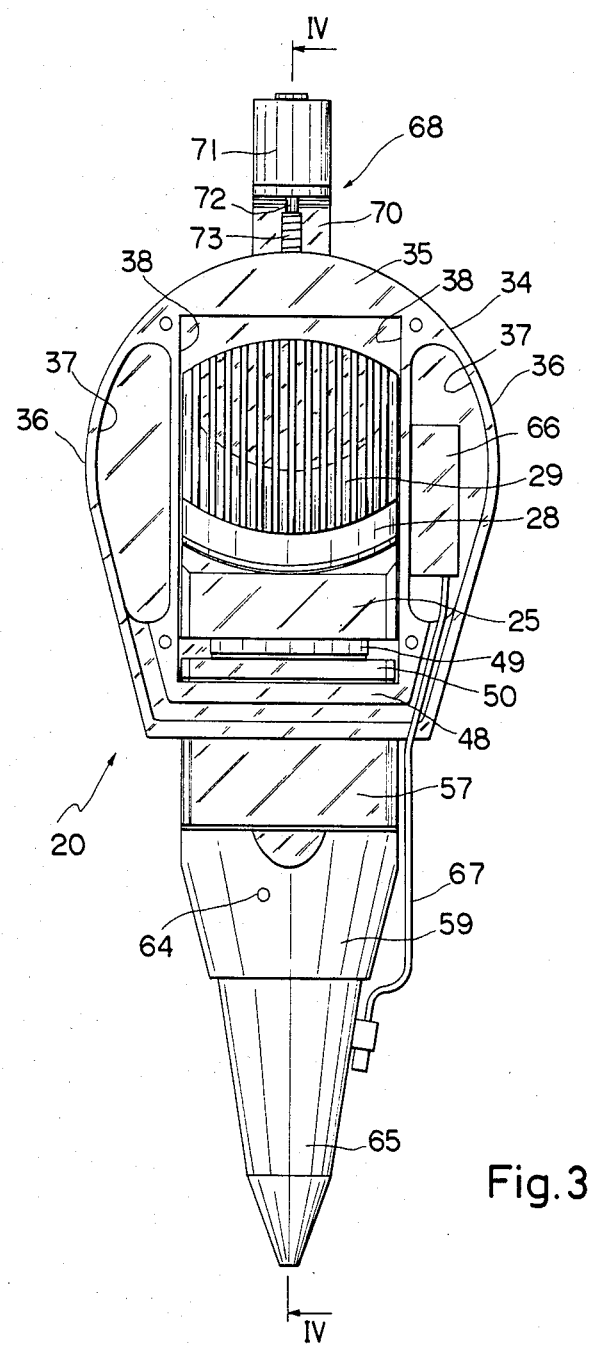
FIG. 3 is a front view showing part of the cutting machine shown in FIG. 2 in more detail.
Figure 6:
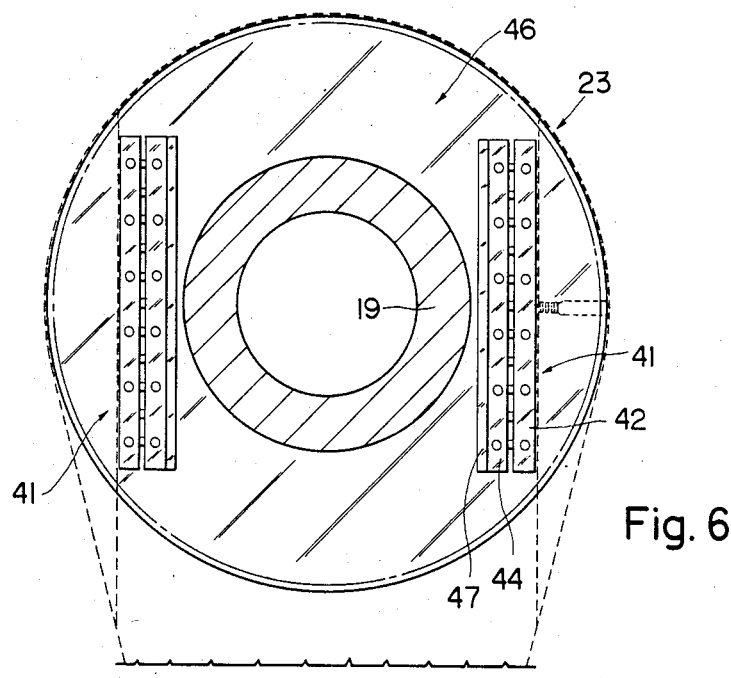
FIG. 6 is a cross-sectional view showing part of what appears in FIG. 4 and FIG. 5 in more detail.

This cavity 37 is blocked off by a wall 39 in the direction of the element 14. The outer surface of the wall 39 lies on almost the same plane as the surface 30. In the position adjacent to the latter is a longitudinal recess 40. This latter recess internally receives a guide 41 for a ball comprising first and second rails 42, 44, as shown in FIGS. 3 and 6. The first rail 42 is fixed to the wall 39 by a screw 43. The second rail 44 is fixed to the end surface 46 of the gear 23 by a screw 45, and is in contact with a rib 47, which is attached to the surface 46 and extends parallel to the axis of the tubular body 25.

The hollow body 34 is fitted with a ring 48 of nearly rectangular outer circumference. Its distance from the wall 35 is greater than the length of the body 25. The ring 48 is coupled to the bottom end of the wall 36 and is located below the bottom end of the tubular body 25. The latter is coupled to a short cylindrical tube 49 which has a central external flange 50, and is solidly coupled to the ring 48 in such a way that there is play between the flange 50 and the ring 48. The upper part of the short tube 49 above the flange 50 can vertically slide against the surface of a cylindrical guide tube 51 having a packing therein, with which it forms a fluid-tight seal. Meanwhile, the lower part of the short tube 49 below the flange 50 forms an annular chamber 52 for cooling fluid together with the inner surface of the ring 48. One side of the chamber 52 is connected to an external supply tube 53 for the fluid; the other side of the chamber 52 is connected through an annular clearance 54 to a tube 55 which is bounded by the short tube 49 and is coaxial with the chamber 52. The clearance 54 is formed so that it directs the cooling fluid toward the inner surface of a focussing lens 56. This lens is coupled to a second ring 57 which seals the tube 55 and is solidly coupled to the bottom surface of the ring 48.

An axial cylindrical appendage 58 of the third ring 59, which is coupled to the ring 57 and is crossed by a short tube 60 which is coaxial with the tube 55, is attached to the interior of the lower part of the tube 57 below the lens 56. The appendage 58 forms an annular chamber 61, together with the ring 57, for the cooling fluid which is supplied by an external tube 62 to the annular chamber 61 and passes through an annular clearance 63 between the chamber 61 and the tube 60 to the outer surface of the lens 56.

An exit nozzle 65 is fixed to the interior of the lower part of the tube 60 by a screw 64 so that its position can be adjusted in the axial direction. The nozzle 65 constitutes an inductive transducer for a servomechanism 68 together with a circuit element 66 which is lodged inside one or both cavities 37 and is connected to the nozzle 65 by an electrical cable 67. The servomechanism 68 has a logic unit 69. This is located above the wall 35 and is supported by a metal fixture 70 which is fixed to the gear 23. One side of the logic unit 69 receives a signal which is emitted from the circuit element 66 and is proportional to the instantaneous distance between the lower tip of the nozzle 65 and a specific surface of the work piece (referred to below as the "reference surface"). The other side of the logic unit receives a fixed electrical signal which is proportional to the correct distance. In addition, the servomechanism 68 includes a linear drive device 71 which is supported by a metal fixture 70 and has an output shaft 72 which is parallel to the axis of the tubular body 25. This shaft 72 has a threaded tip 73. The hollow body 34, the short tube 49, the rings 57 and 59, the lens 56 and the nozzle 65 are suspended from the tip 73. These can move between an upper position where the flange 50 contacts the lower end of the body 25, and a lower position approximately as shown in FIG. 4, through a distance of several millimeters, which at a maximum is equal to the difference between the length of the tubular body 25 and the distance between the wall 35 and the ring 48.

While the machine is in use, the head 20 is moved through a specified path under the control of the computer 24 in the structure 4 to cut the work piece no matter how irregular the latter is.

During cutting, the head 20 keeps its nozzle 65 at an optimum distance from the work piece, through the action of the servomechanism 68 which keeps the lens 56 focused on the reference surface on the work piece. The servomechanism, undisturbed by the motion which is controlled by the computer 24, continuously measures the distance between the lens 56 and the surface of the work piece facing it, by means of the nozzle 65 and the element 66. This distance, added to a constant value which is externally imposed and which is equal to the distance, if it exists, between the surface and the "reference plane" on the work piece, is compared with a fixed value equal to the focal length of the lens 56. When the structure 4 is functioning correctly and is correctly oriented by the computer 24, the two values differ only when the work piece has deformations which cannot be accounted for in the program which is input into the computer 24. These deformations correspond to deviations of the focal point of the lens 56 from the "reference plane" on the work piece. The logic unit 69 causes the drive device 71 to move the lens 56 in the axial direction so that it is kept in the optimum position with respect to the work piece.

In summary, in the laser cutting machine of the present invention, the focusing head (20) hangs from the joint structure (4), and has an exit nozzle (65) inside the said structure. It is held at a fixed, unvarying, theoretically determined distance from the surface of the flat work piece (usually a thin metal plate) to be cut, and can be moved through a predetermined path while remaining in a vertical orientation. The focusing head (20) has a first portion (25) which connects to the structure (4), and second portion (34) which supports the nozzle (65) and the focusing lens (56) and is coupled to the first portion (25) in such a way that it slides in the axial direction of the said nozzle (65). This nozzle constitutes an inductive transducer for the servomechanism (68) which controls the said axial motion.

It is to be understood that although the invention has been described with specific reference to particular embodiments thereof it is not to be so limited, since changes and alterations therein may be made which are within the full intent and scope of this invention as defined by the appended claims.

We claim:

1. A laser cutting machine, comprising:
    a focusing head having first and second head portions movable relative to each other in the axial direction;
    an exit nozzle and a focusing lens coupled to one of said first and second portions;
    a joint structure which supports said focusing head;
    a control unit;
    drive means supported by said joint structure and controlled by said control unit for moving said focusing head along a specified path in space;
    means for maintaining a predetermined, invariant distance between the exit nozzle and a workpiece to be cut, said distance maintaining means comprising a servomechanism means for controlling the relative movement of said two head portions in the axial direction independently of said control unit to maintain said distance between said nozzle and said workpiece.

2. The machine as described in claim 1 wherein said servomechanism means comprises an inductive transducer for sensing the distance between the exit nozzle and the workpiece, said exit nozzle constituting said inductive transducer.

3. The machine as described in claim 1, wherein said first portion of said head has a tubular body that is coaxial with said nozzle, and said second portion is attached to said tubular body in such a way that it is free to slide along a guide which is coupled to said tubular body.

4. The machine as described in claim 3, wherein said guide is attached to one end of a gear which is coupled to said tubular body, and it is perpendicular to the axis of said tubular body.

5. The machine as described in claim 1, wherein said second portion also supports a direction changing mirror.

6. The machine as described in claim 1, wherein said servomechanism means supports said first portion, and in addition it has a drive device which has an output shaft that is coupled to the second portion.

7. The machine as described in claim 6, wherein said drive device is supported by said gear.

* * * * *